Figure 1:
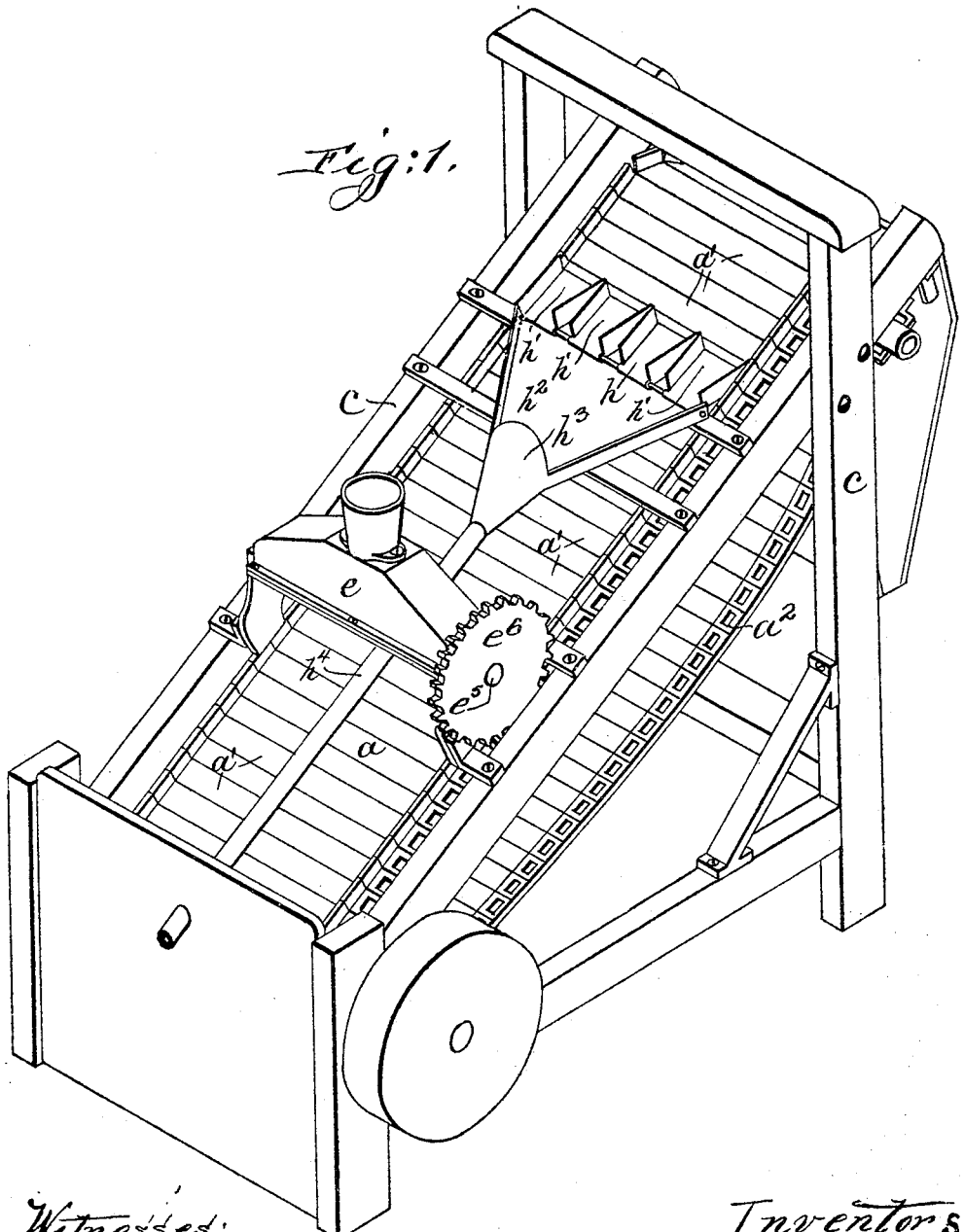

No. 800,690. PATENTED OCT. 3, 1905.
G. STUART & C. McDONALD.
GRAIN SEPARATING MACHINE.
APPLICATION FILED NOV. 19, 1900.

4 SHEETS—SHEET 3.

Witnesses:
R. J. Jacker,
C. Elwood Bell

Inventors
George Stuart & Charles McDonald
By Jones & Addington
Attorneys

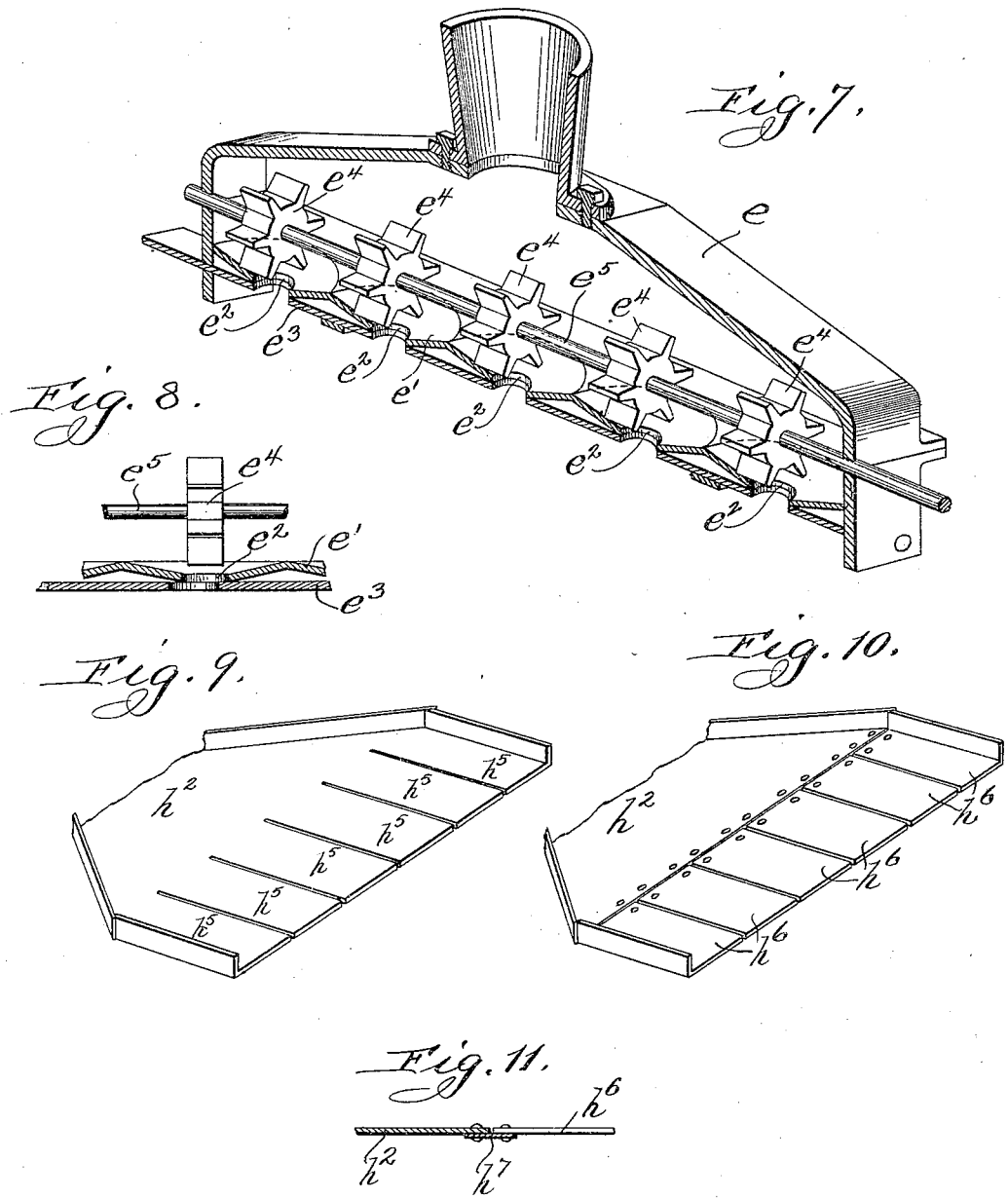

UNITED STATES PATENT OFFICE.

GEORGE STUART, OF CHICAGO, ILLINOIS, AND CHARLES McDONALD, OF CEDAR RAPIDS, IOWA, ASSIGNORS TO THE AMERICAN CEREAL COMPANY, OF CHICAGO, ILLINOIS, A CORPORATION OF OHIO.

GRAIN-SEPARATING MACHINE.

No. 800,690. Specification of Letters Patent. Patented Oct. 3, 1905.

Application filed November 19, 1900. Serial No. 37,013.

*To all whom it may concern:*

Be it known that we, GEORGE STUART, residing at Chicago, in the county of Cook and State of Illinois, and CHARLES McDONALD, residing at Cedar Rapids, in the county of Linn and State of Iowa, citizens of the United States, have invented a certain new and useful Improvement in Grain-Separating Machines, of which the following is a full, clear, concise, and exact description, reference being had to the accompanying drawings, forming a part of this specification.

Our invention relates to a grain-separating machine, our object being to provide an improved form of mechanism for separating hulled from unhulled grain, the invention having been developed more particularly with reference to the separation of hulled oats from unhulled oats. While the invention is particularly adapted for this kind of grain or cereal, it will be apparent that it is equally applicable to the separation of similar grains.

In accordance with our invention we provide a traveling belt or apron of the general form shown in United States Letters Patent No. 491,594, granted to George H. Rich February 14, 1893. In said Letters Patent the belt is shown as formed of a plurality of transverse bars or slats suitably hinged together to form a continuous belt or apron, the outer surfaces of the bars being provided with recesses or cells to form pockets adapted to receive and retain small seeds of a spherical form which are frequently intermingled with the grain and which it is desired to remove therefrom. The structure of the Rich Letters Patent above mentioned is designed to remove these small spherical seeds from the oats or other grain, and to accomplish this purpose the belt or apron travels upward in an inclined position, and the oats or other grain are delivered to the belt or apron near the upper end thereof and travel downward over the face of the belt. The size of the pockets or recesses is such that the oats are permitted to freely pass over the face of the apron and are delivered to a suitable receptacle at the lower end thereof, while the small spherical seeds fall into the pockets and are carried upward with the belt or apron and are delivered to a receptacle at the upper end of the belt or apron.

In accordance with the present invention the object is to separate the hulled from the unhulled oats or other similar grain, and we have discovered that by properly constructing the cellular surfaces of the bars or slats and by properly disposing the angle of travel of the apron the same may be caused to frictionally engage the hulled oats in such a manner as to cause the same to gradually ascend the apron, although at a slower speed than the travel of the apron, while the unhulled oats, due apparently to the greater smoothness of the surfaces thereof, are permitted to descend. In carrying out our invention we deliver the mixed hulled and unhulled oats to be separated at a point near the lower end of the apron, usually at a point intermediate the middle and the lower end of the apron. The engagement of the cellular surface of the moving apron with the hulled oats causes the same to gradually ascend the apron and to pass to the upper end thereof. Some of the unhulled oats will immediately pass to the lower end of the apron, while some of the unhulled oats will slowly ascend for a short distance and then descend again to the lower end of the apron. Near the upper end of the apron there is a point which seems to mark the limit of the upward travel of which the unhulled oats are capable, and above this point will be found the hulled oats alone, the same having been thoroughly separated from the unhulled oats. The hulled oats thus accumulating at the upper end of the apron may be removed in any desired manner. We preferably provide a catch-apron having a free edge adapted to rest upon the apron near the upper end thereof, beneath which free edge the hulled oats will readily pass and upon which the hulled oats are adapted to be deposited and thence conducted from the machine in any desired manner. The cellular pockets may serve, as in the Rich Letters Patent above mentioned, to receive small spherical seeds, which will pass over the upper end of the apron and may thus be delivered into any suitable receptacle. During the operation of the machine examination will show that there are practically three currents of grain—first, the fine spherical seeds which are carried upward in the pockets or cells of the apron and are moved consequently at the same speed as the apron; second, the hulled oats which gradually and continuously ascend at a speed less than that of the travel of the apron, and, third, the unhulled oats, part of which are traveling downward and part of which partake of an upward travel much slower, however, than the hulled oats. The unhulled oats constituting this third stream will eventually find their way to the receptacle at the lower end of the apron, and thus the general trend of the unhulled oats is in a downward direction.

While we preferably employ the cells or recesses as pockets for removing the small spherical seeds from the grain, this is not essential to the operation of the machine, and other mechanism may be employed for removing these foreign seeds. In such case the unhulled oats will, as above, descend to the lower end of the apron, while the hulled oats are carried to the upper end of the traveling apron, where they may be collected and removed by the catch-apron. Instead of employing means for removing the hulled grain in the form of a catch-apron any other suitable means for accomplishing this removal of the hulled grain passing to the upper end of the traveling apron may be employed without departing from the spirit of our invention.

We have illustrated our invention in the accompanying drawings, in which—

Figure 2:
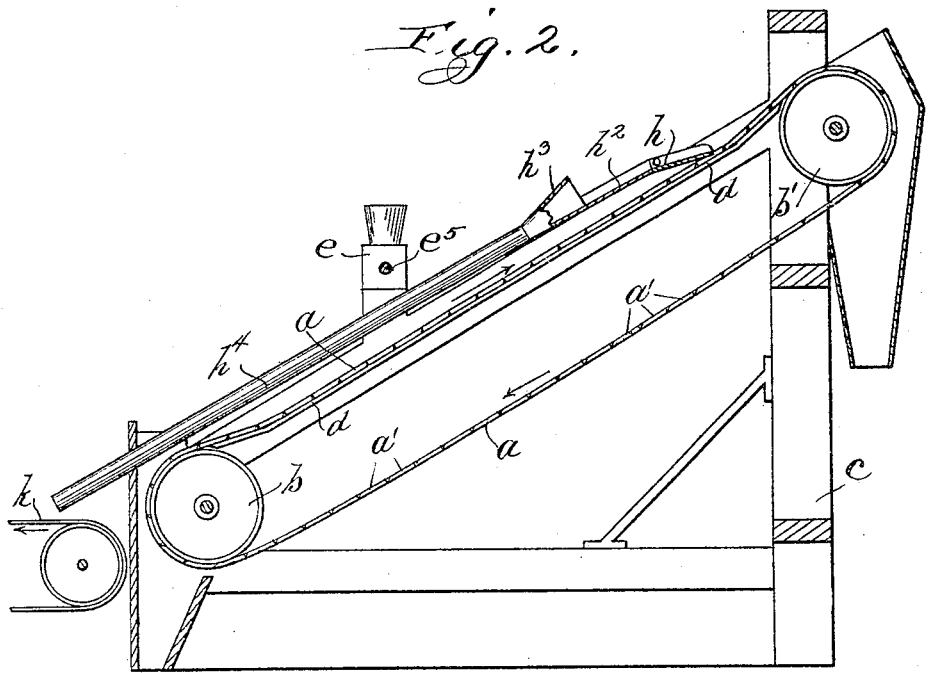
Figure 3:
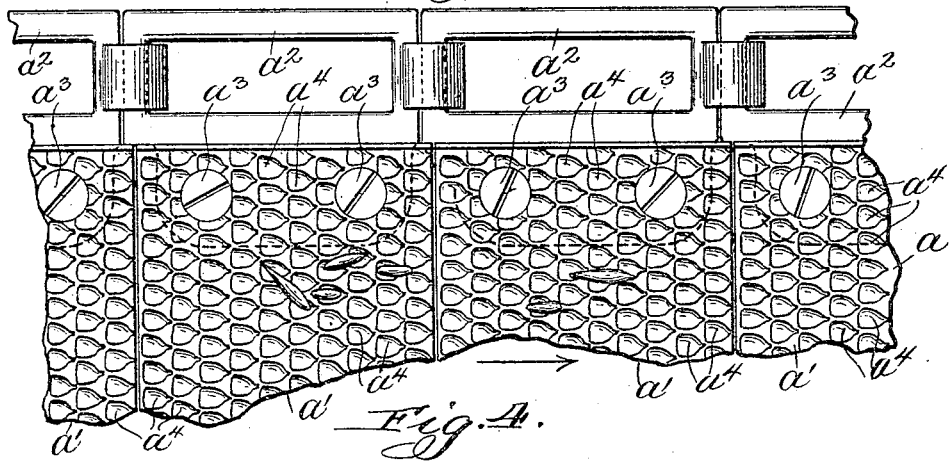
Figure 4:
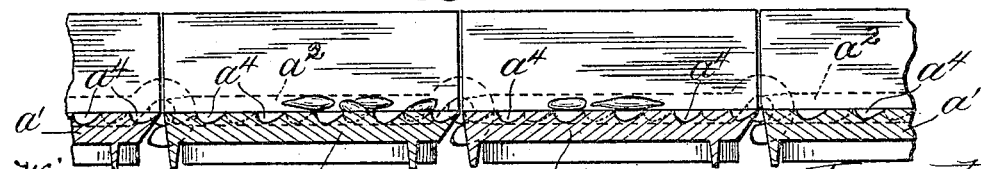
Figure 5:
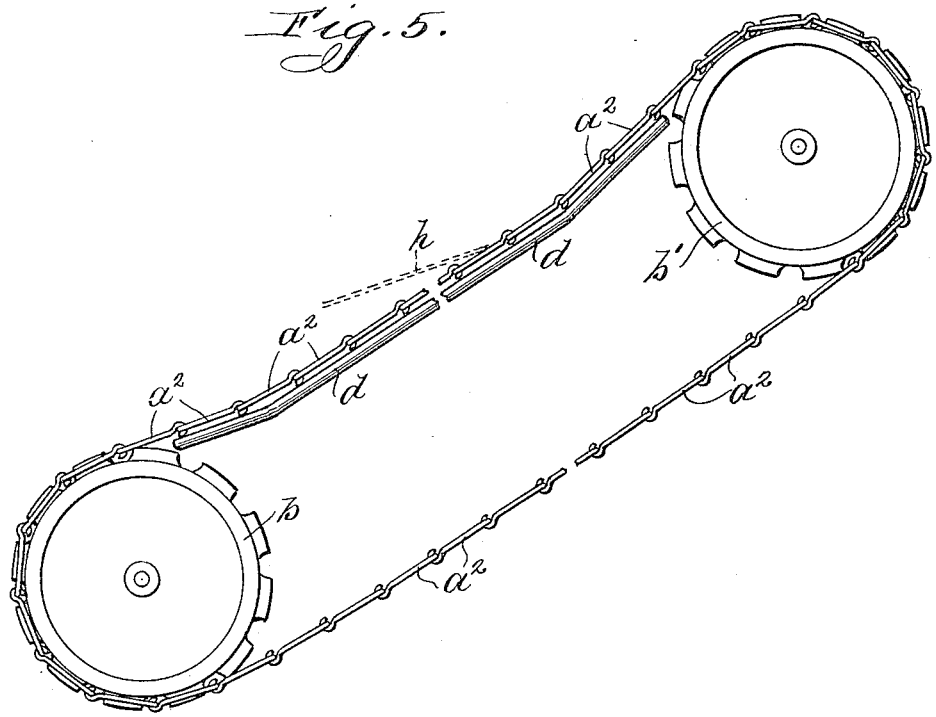
Figure 6:

Figure 1 is an isometric view of a separating-machine embodying our invention. Fig. 2 is a view thereof in elevation, partially in section. Fig. 3 is a partial plan view of the apron. Fig. 4 is a sectional view thereof. Fig. 5 is a detail view of the apron and guide therefor. Fig. 6 is a transverse sectional view of the apron and the guides therefor. Fig. 7 is a detail view of the hopper and the feeding mechanism therein. Fig. 8 is a view of a portion of the hopper and the feeding mechanism. Figs. 9 and 10 are detail views of modified forms of the catch-apron. Fig. 11 is a sectional view of the catch-apron shown in Fig. 10.

Like letters refer to like parts in the several figures.

The apron $a$ comprises a plurality of strips or bars $a'$ $a'$, provided at the opposite ends with links $a^2$ $a^2$, hinged together at the edges, so that the same may swing about the edges of the bars as axes. The edges of the bars are chamfered or cut away, as shown more clearly in Fig. 4, to permit the bars to fold about the sprocket-wheels $b$ $b'$, carried upon the frame $c$ of the machine. The belt thus comprises, in effect, two sprocket-chains supporting between them the transverse bars, the edges of which rest in contact. The bars $a'$ $a'$ are secured to the links $a^2$ $a^2$ by means of screws $a^3$ $a^3$. The faces of the bars $a'$ $a'$ are provided with cells or receptacles $a^4$ $a^4$, preferably of the form and size illustrated in Figs. 3 and 4, which figures show the parts drawn to scale when employed for the separation of hulled from unhulled oats. It will be noted that the cells are not of sufficient size to permit either the hulled or the unhulled oats to rest therein as in a pocket, so that the receptacles are incapable of carrying the grains bodily upward. The result is that while the pockets are of sufficient size to receive and retain small spherical seeds which may be mixed with the oats they are not of sufficient size to retain either the hulled or unhulled oats. The unhulled oats, due to the smoothness of the coat thereon, glide freely and readily over the surfaces of the cellular strips. An examination of the hulled oats will disclose the fact that they are covered with fine hairs or fibers, and we account for the operation by the fact that the ciliated surface of the hulled grain permits the cellular surface of the apron to frictionally engage the grain to thereby gradually move the same upward. The smooth coat of the unhulled grain permits the same to pass immediately downward over the apron, except as the same may be carried upward a short distance due to physical engagement with the upwardly-traveling hulled grains and with the recesses.

The apron as it passes from wheel $b$ to wheel $b'$ is adapted to rest upon the guide-bars $d$ $d$. These bars are slightly bent at the opposite ends, thereby permitting the apron to sag somewhat as it passes from the wheel $b$ to wheel $b'$. The belt or apron $a$ makes a slight dip, therefore, as it leaves the wheel $b$, then travels in a direct line until it approaches the upper wheel $b'$, when it makes a slight upward bend and passes over the wheel $b'$. Near the lower end of the apron $a$ the hopper $e$ is provided, which is adapted to deliver the mixed grain to the apron $a$. As shown more clearly in Figs. 7 and 8, the hopper is provided with a floor $e'$, having a plurality of holes $e^2$ $e^2$ therein, and beneath the floor $e'$ is a bar $e^3$, provided with holes adapted in one position to register with the holes $e^2$ $e^2$. By moving the bar $e^3$ longitudinally the size of the openings through which the grain may pass from the hopper may be varied as desired. Above each of the holes is a toothed wheel $e^4$ $e^4$, said wheels being mounted upon a shaft $e^5$, carrying upon the end a toothed wheel $e^6$, adapted to engage the sprocket-chain formed on one side of the apron or belt, whereby as the belt travels the wheels $e^4$ $e^4$ are caused to rotate to thereby feed the grain through the openings in the floor of the hopper.

Near the upper end of the traveling apron $a$ a catch-apron $h$ is provided. This apron preferably comprises a plurality of leaves $h'$ $h'$, hinged at the rear ends and resting at the forward ends upon the traveling apron $a$. The side edges of the leaves $h'$ are turned upward into the vertical positions to thereby guide the grain to the pan $h^2$, which terminates in a funnel $h^3$, which communicates with a duct $h^4$, extending to the lower end of the machine and adapted to deliver its contents upon a conveyer $k$, which carries the same to the desired locality.

Instead of forming the catch-apron as shown in Figs. 1 and 2, wherein the apron takes the form of hinged leaves, the catch-apron may be formed as shown in Fig. 9, in which the end of the pan $h^2$ is provided with longitudinal slits to thereby form a plurality of leaves $h^5$ $h^5$, the flexibility of the leaves permitting the grain to pass freely under the ends thereof as the grain is carried upward by the traveling apron. In Fig. 10 the leaves $h^6$ $h^6$ are secured to the pan $h^2$ by means of a leather strip $h^7$, which serves as a hinge.

The hopper $e$ is situated above the bend which is provided in the traveling apron near the lower end thereof, and we find that this bend facilitates the separating process and prevents the grain from too readily passing from the lower end of the apron. The bend provided in the traveling apron at the upper end thereof is situated a short distance above the free ends of the leaves of the catch-apron, and this bend facilitates the delivery of the hulled grain to the catch-apron. The passage of the hulled grain beneath the free ends of the leaves of the catch-apron and the change in direction of the apron in the vicinity of the catch-apron coöperate in causing the hulled grain to fall back upon the catch-apron, and the grain thence passes through the duct $h^4$ to the conveyer $k$.

It is supposed that the difference in surface between the hulled and unhulled oats accounts for the elevation of the one and the descent of the other. It will be noted that the unhulled grain has a hard, smooth coat, while the hulled grain is ciliated and somewhat rough. The fact that some of the unhulled grain immediately descends, while another portion rises for a short distance, may be accounted for by the fact that a portion of the grain is permitted to slide immediately to the lower end of the apron, while other grains are mechanically engaged by the belt or by the ascending hulled grains, thus bodily raising the unhulled grains until such a time as they may become freed and be permitted to slide down over the top of the layer of hulled grain. The passage of the hulled grain backward upon the catch-apron may be accounted for by the fact that the grain passes beneath the free end of the apron and by the further fact that the apron partakes of a slight angular movement just above the edge of the catch-apron.

Having described our invention, what we claim as new, and desire to secure by Letters Patent, is—

1. In a machine for separating hulled from unhulled grain, the combination with an inclined traveling apron, the surface of said apron having indentations formed therein, said indentations producing a multiplicity of corners or edges with which the grain is adapted to come in contact, said edges being adapted to frictionally engage and elevate the hulled grain, while permitting the unhulled grain to descend, of means arranged at an intermediate position for feeding the grain to said apron, and means for removing the hulled grain from the upper end of said traveling apron.

2. In a machine for separating hulled from unhulled grain, the combination with an inclined traveling-apron, the surface of said apron having indentations formed therein, said indentations producing a multiplicity of corners or edges with which the grain is adapted to come in contact, said edges being adapted to frictionally engage and elevate the hulled grain, while permitting the unhulled grain to descend, of a receiver at the lower end of said traveling apron for receiving the unhulled grain, means arranged at an intermediate position for feeding the grain to said apron, and means for removing the hulled grain from the upper end of said traveling apron.

3. In a machine for separating hulled from unhulled grain, the combination with an inclined traveling apron, the surface of said apron having indentations formed therein, said indentations producing a multiplicity of corners or edges with which the grain is adapted to come in contact, said edges being adapted to frictionally engage and elevate the hulled grain, while permitting the unhulled grain to descend, of a receiver at the lower end of said traveling apron for receiving the unhulled grain, means arranged at an intermediate position for feeding the grain to said apron, and a catch-apron at the upper end of said traveling apron for removing the hulled grain therefrom.

4. In a grain-separating machine, the combination with an inclined traveling apron having the surface thereof suitably formed and situated to engage and elevate a part of the grain while permitting another part to descend, of means for feeding the grain thereto at an intermediate position, a receiver at the lower end of said traveling apron, and a catch-apron at the upper end of said traveling apron, said apron having a free end and being adapted to engage and collect the grain from the traveling apron, substantially as described.

5. In a grain-separating machine, the combination with an inclined traveling apron, of means for feeding the grain thereto at an intermediate position, a receiver at the lower end of said traveling apron, and a catch-apron at the upper end of said traveling apron, said catch-apron having a yielding receiving edge adapted to engage and collect the grain from the catch-apron, substantially as described.

6. In a machine for separating hulled from unhulled grain, and for removing small foreign seeds therefrom, the combination with an inclined traveling apron, the surface of said apron having indentations formed therein, said indentations producing a multiplicity of corners or edges with which the grain is adapted to come in contact, said edges being adapted to frictionally engage and elevate the hulled grain, while permitting the unhulled grain to descend, said indentations serving as pockets to receive and retain the small foreign seeds, of means for feeding the grain to said traveling apron at an intermediate position, a receiver for the hulled grain at the lower end of the traveling apron, a receiver for the small foreign seeds at the upper end of said traveling apron, and a catch-apron near the upper end of said traveling apron for removing the hulled grain therefrom.

7. The combination with an inclined traveling apron having the surface thereof suitably formed and situated to engage and elevate the grain to be extracted, of means for feeding the grain to the traveling apron, a catch-apron provided near the upper end of said traveling apron, and guiding means for said traveling apron adapted to cause the same to partake of a slight bend outward from the line of previous travel in the vicinity of the collecting edge of said catch-apron, substantially as described.

8. The combination with an inclined traveling apron having the surface thereof formed to engage and elevate the grain to be extracted, of means for feeding the grain to said traveling apron, grain-collecting means at the upper end of said traveling apron, and guiding means for said apron adapted to cause the same to partake of a slight bend inward from the line of previous travel near the lower end thereof, and below the position at which the grain is delivered to the traveling apron, substantially as described.

9. The combination with a traveling apron, of means for feeding the grain thereto, a catch-apron near the upper end of said traveling apron, and guiding means for said traveling apron adapted to cause the same to partake of a slight bend inward from the line of previous travel at the lower end thereof, and beneath the position where the grain is fed to the apron, and also to partake of a slight bend outward from the line of previous travel at the upper end thereof and in the vicinity of the collecting edge of said catch-apron, substantially as described.

In witness whereof we have hereunto subscribed our names in the presence of two witnesses.

GEORGE STUART.
CHARLES McDONALD.

Witnesses:
W. CLYDE JONES,
M. R. ROCHFORD.